United States Patent [19]

Aikman

[11] Patent Number: 5,044,457

[45] Date of Patent: Sep. 3, 1991

[54] MOTOR VEHICLE CRUISE CONTROL SYSTEM HAVING MODE DEPENDENT GAIN

[76] Inventor: Steven W. Aikman, 7086 Timberwood Dr., Davison, Mich. 48423

[21] Appl. No.: 452,155

[22] Filed: Dec. 15, 1989

[51] Int. Cl.$^5$ ............................................. B60K 31/02
[52] U.S. Cl. ............................... 180/178; 364/426.04; 364/431.07
[58] Field of Search ............... 180/176, 177, 178, 179; 123/352, 361, 399; 364/160, 161, 162, 176, 183, 426.04, 431.07; 361/170

[56] References Cited

U.S. PATENT DOCUMENTS

| | | | |
|---|---|---|---|
| 4,157,124 | 6/1979 | Poore | 180/178 |
| 4,217,867 | 8/1980 | Madsen et al. | 180/178 X |
| 4,245,599 | 1/1981 | Des Lauriers | 180/178 X |
| 4,374,422 | 2/1983 | O'Keefe, Jr. et al. | 180/176 X |
| 4,643,038 | 2/1987 | Byram | 180/178 X |
| 4,684,866 | 8/1987 | Nehmer et al. | 318/696 |
| 4,849,892 | 7/1989 | McCombie | 180/178 X |
| 4,860,210 | 8/1989 | McCombie | 180/176 X |
| 4,884,203 | 11/1989 | Preis et al. | 364/426.04 |

FOREIGN PATENT DOCUMENTS 0081239  4/1986  Japan ................................. 180/176

Primary Examiner—Andres Kashnikow
Assistant Examiner—Brian L. Johnson

[57] ABSTRACT

A motor vehicle cruise control in which the control gain is relatively high in the normal mode of operation and relatively low in the resume and acceleration modes of operation. In the normal mode of operation, a position command for an engine throttle actuator is retrieved from a high gain look-up table as a function of the vehicle speed error. In the resume and acceleration modes of operation, the position command is retrieved from a low gain look-up table as a function of the vehicle speed error. Changes in the position command at transitions between the low gain and high gain tables are eliminated through a suitable offset of the speed error used in the position command look-up, thereby assuring a smooth transition between the normal mode and the resume or acceleration modes.

4 Claims, 5 Drawing Sheets

MOTOR VEHICLE CRUISE CONTROL SYSTEM HAVING MODE DEPENDENT GAIN

This invention relates to motor vehicle speed or cruise control systems, and more particularly, to a control for scheduling the control gain in different modes of operation.

BACKGROUND OF THE INVENTION

Vehicle speed or cruise control systems typically incorporate an actuator for positioning the throttle of the vehicle engine in relation to the error, or difference, between an operator determined speed command Ncmd and a measure of the actual vehicle speed Nv. In other words, the speed error is periodically computed and used to determine a position command for the throttle or throttle actuator. The gain of the control is defined as the scheduled change in position command per unit change in speed error.

Ordinarily, the control gain is set relatively high in order to achieve accurate steady state speed control of the vehicle. Control under such conditions is referred to herein as the "normal" mode of operation. However, in modes of operation which accelerate the vehicle to a new speed, the relatively high gain of the normal mode of operation results in excessive throttle movement which adversely affects the driveability of the vehicle. Such modes include the "resume" mode in which the speed control is reactivated to a previously set speed command following an operator-interruption of the control, and the "acceleration" mode in which the operator requests the control to increase the speed command.

SUMMARY OF THE PRESENT INVENTION

The present invention is directed to an improved motor vehicle cruise control in which the control gain is relatively high in the normal mode of operation and relatively low in the resume and acceleration modes of operation. In the normal mode of operation, the position command is retrieved from a high gain look-up table as a function of the vehicle speed error. In the resume and acceleration modes of operation, the position command is retrieved from a low gain look-up table as a function of the vehicle speed error. Changes in the position command at transitions between the low gain and high gain tables are eliminated through a suitable offset of the speed error used in the position command look-up, thereby assuring a smooth transition between the normal mode and the resume or acceleration modes.

DETAILED DESCRIPTION OF THE DRAWINGS

Figure 1:
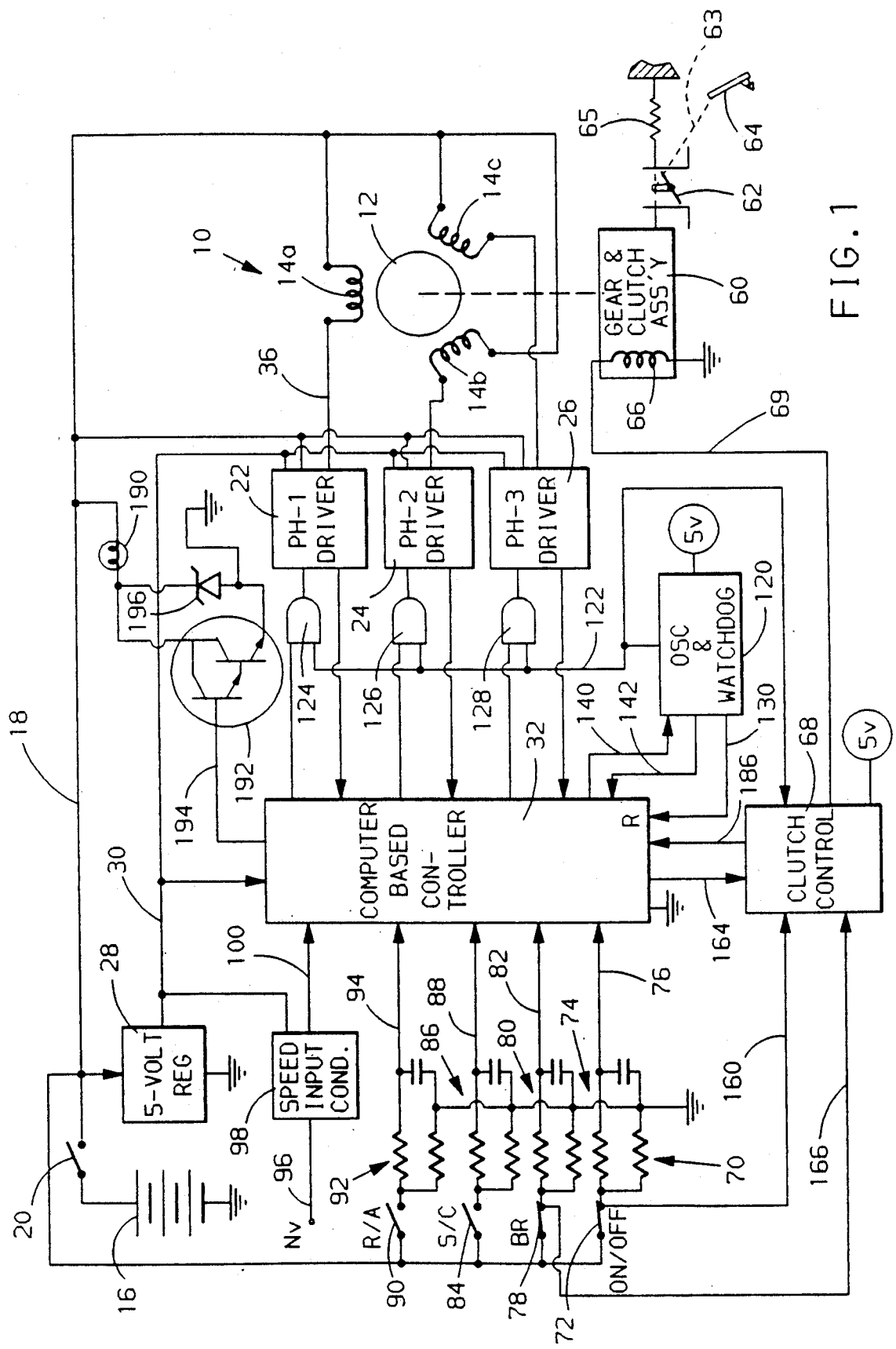
FIG. 1 is a system diagram of a computer based motor vehicle cruise control system according to this invention.

Referring to the drawings, particularly to FIG. 1, the reference numeral 10 generally designates an electric stepper motor having a permanent magnet rotor 12 and three-phase WYE-connected stator windings 14a-14c. One terminal of each winding 14a-14c is connected to the positive terminal of the vehicle storage battery 16 via line 18 and an ignition switch 20. The other terminal of winding 14a is connected to the phase driver 22; the other terminal of winding 14b is connected to the phase driver 24; and the other terminal of winding 14c is connected to the phase driver 26.

The phase drivers 22-26 and various other circuit blocks depicted in FIG. 1 are operated at a relatively low voltage (such as 5 volts) as provided by the voltage regulator 28 on the line 30. The connection of such voltage to certain of the circuit blocks is indicated by the circled 5V designation.

Phase drivers 22-26 each include a power switching device which is turned on and off by a computer based controller 32 to alternately energize and deenergize the respective phase windings 14a-14c in predetermined sequence for producing a rotating magnetic field in the stator of motor 10.

The rotor 12 of stepper motor 10 is mechanically connected through a reduction gearset and clutch assembly 60 to an engine throttle 62. The throttle 62 is also mechanically connected via a suitable linkage 63 to a driver manipulated accelerator pedal 64. When the cruise control is active, the motor 10 controls the throttle position through the reduction gearset and clutch assembly 60; when the cruise control is inactive, the driver controls the throttle position through the linkage 63. A return spring 65 biases throttle 62 toward a closed position. The clutch of reduction gearset and clutch assembly 60 is selectively activated by the solenoid coil 66 to make or break the mechanical connection between rotor 12 and throttle 62. A reduction gearset and clutch assembly meeting the above description is set forth in detail in the U.S. Pat. No. 4,643,038, to Byram issued Feb. 17, 1987, assigned to the assignee of the present invention. The energization of solenoid coil 66 is controlled by the clutch control circuit 68 via line 69.

The reference numeral 70 generally designates a plurality of driver input circuits pertinent to vehicle speed control. Each such switch is connected between the downstream side of ignition switch 20 and the computer based controller 32. The ON/OFF switch 72 is connected to the controller 32 through RC network 74 and input line 76. Switch 72 is actuated by the driver to enable or disable the vehicle speed control function. The brake (BR) switch 78 is connected to the controller 32 through RC network 80 and input line 82. The ON/OFF and BR switches 72 and 78 also provide inputs to the clutch control circuit 68 via lines 160 and 166. The set/coast (S/C) switch 84 is connected to the controller 32 through RC network 86 and input line 88. Switch 84 is normally open, and is closed momentarily or continuously by the driver to set a desired vehicle speed or to coast to a slower vehicle speed. The resume/acceleration (R/A) switch 90 is connected to the controller 32 through RC network 92 and input line 94. Switch 90 is normally open, and is closed momentarily or continuously by the driver to resume operation at a previously set speed command or to accelerate to a new, higher speed command.

A vehicle speed signal Nv on line 96 is applied to input conditioning circuit 98 which supplies a vehicle speed feedback signal to controller 32 via input line 100.

A watchdog circuit 120 cooperates with the controller 32 in a conventional manner to detect the occurrence of a controller malfunction. In the event of a malfunction, the watchdog circuit 120 operates to deenergize the phase windings 14a-14c via line 122 and AND gates 124-128, to disengage the clutch of gearset and clutch assembly 60 via line 122 and clutch control circuit 68, and to reset the controller 32 via line 130. A feedback signal indicative of the state of clutch control circuit 68 is provided to controller 32 on line 186.

In addition to controlling the energization of windings 14a-14c and the solenoid coil 66, the controller 32 operates a driver indicator lamp 190. Essentially, the lamp 190 is illuminated whenever the vehicle speed control function is active. The lamp is connected between the battery supply line 18 and ground potential via the Darlington transistor 192, and controller 32 controls the conduction of transistor 192 via line 194. The Zener diode 196 protects transistor 192 from damage due to voltage transients.

Figure 2A:
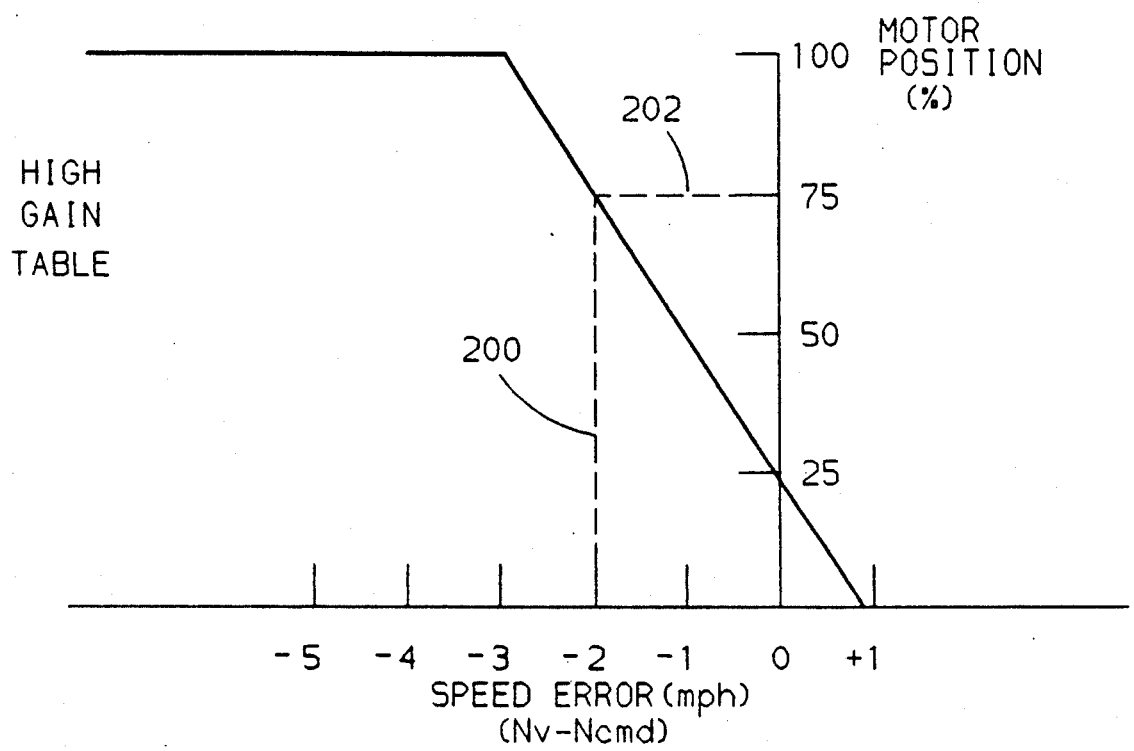
FIGS. 2a-2b are graphs depicting the high gain and low gain tables used to schedule throttle actuator position.
Figure 2B:
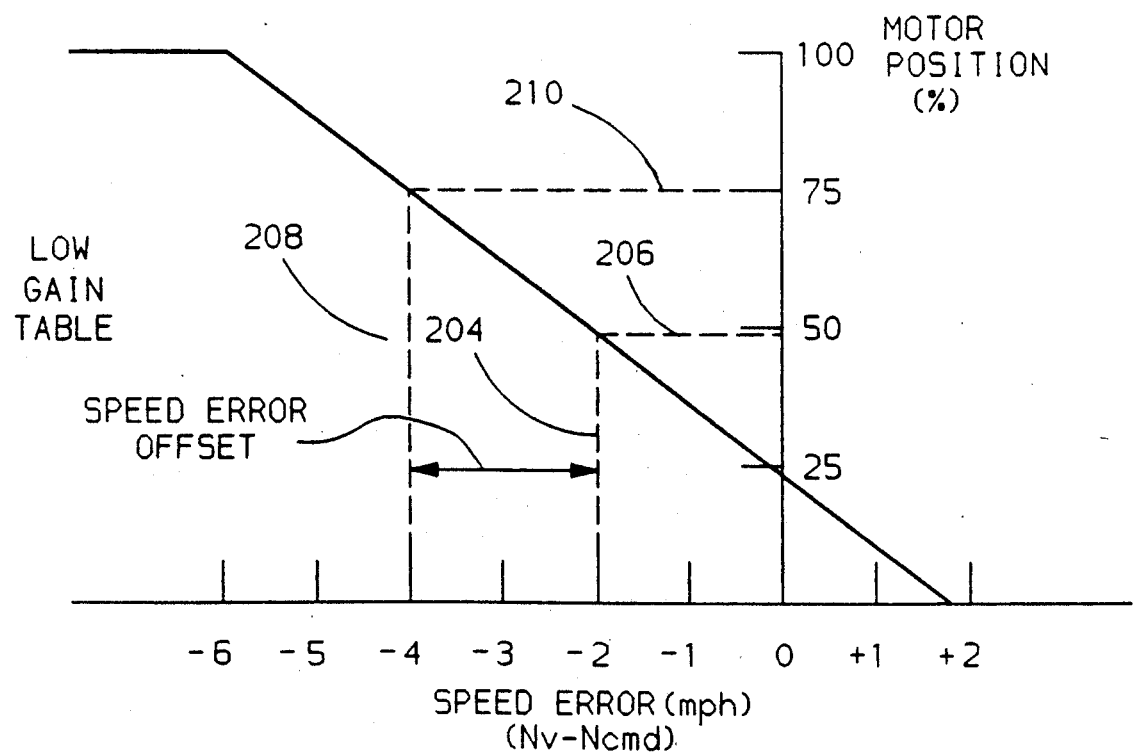

FIGS. 2a and 2b schematically depict the scheduled motor position command as a function of speed error in Miles Per Hour (MPH) for the high gain and low gain tables, respectively, of controller 32. As indicated above, the high gain table schedules a relatively large change in commanded motor position for a given change in speed error, as is generally desired for achieving accurate steady state speed control during the normal mode of operation. By comparison, the low gain table schedules a relatively small change in commanded motor position for a given change in speed error, as is generally desired during the resume and acceleration modes of operation.

Unfortunately, a simple transition between the low gain and high gain tables produces an undesired step change in the commanded motor position. For example, a speed error of −2 MPH corresponds to a high gain motor position of 75% travel, and a low gain motor position of only 50% travel. In order to avoid the step change and instead effect a smooth transition between gain tables, the control of this invention generates an offset for the speed error signal used in the motor position command look-up. The offset is revised at each transition between gain tables, and is chosen such that the motor position command immediately before and after the transition is substantially the same.

The operation of the offset is best illustrated by an example. For the purpose of the example, it is assumed that the offset is initially zero, the normal cruise control mode is in effect, and the actual vehicle speed error is −2 MPH. This condition is represented by the vertical broken trace 200 in FIG. 2a. As indicated by the corresponding horizontal broken trace 202, the motor position command for this situation is approximately 75%. If the vehicle operator now closes the resume/acceleration switch 90 to accelerate the vehicle to a higher cruise speed, a transition to the low gain table of FIG. 2b is appropriate. Without the speed error offset, the low gain table would yield a motor position command of approximately 50%, as indicated by the broken traces 204 and 206—a position reduction that would result in an action opposite to that required to accelerate the vehicle. To achieve a smooth gain table transition, the low gain speed error would have to be approximately −4 MPH, as indicated by the broken lines 208 and 210. In other words, a speed error offset of approximately 2 MPH is required.

According to this invention, the correct speed error offset is updated at the time of the gain table transition by performing an inverse look-up from the target table (the low gain table in the above example) based on the present motor position command. The result of the look-up is the speed error which would be required in the target table to yield the same motor position command. The offset to be applied to the speed error while operating in the low gain table is thus the difference between the actual speed error and the required speed error.

When the operator releases the resume/acceleration switch 90 to return to normal cruise operation at the new vehicle speed, a transition to the high gain table of FIG. 2a is appropriate. To ensure a smooth transition, the speed error offset is updated in the manner described above.

A similar situation occurs when the cruise control is disengaged, and the operator momentarily depresses the resume/acceleration switch 90 to resume operation at a previously set speed command. Here, the initial motor position command is retrieved from the low gain table of FIG. 2b, and a transition to the high gain table of FIG. 2a occurs when the vehicle speed achieves the previously set speed command.

In view of the above, it will be recognized that this invention effectively redefines the speed error as follows:

$$SPEED\ ERROR = Nv - Ncmd - OFFSET$$

where Nv is the actual vehicle speed, Ncmd is the operator selected speed command, and OFFSET is the speed error offset referred to above.

Figure 3A:
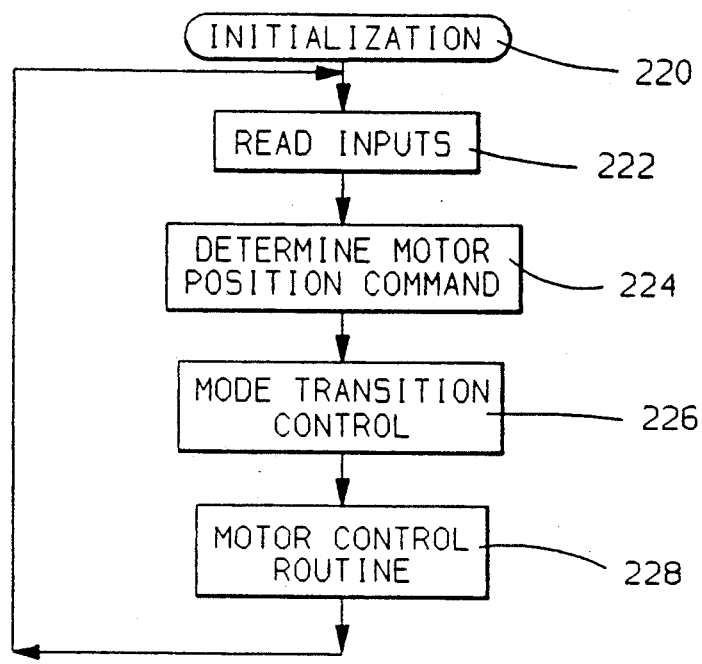
FIGS. 3a-3d are flow diagrams representative of computer program instructions for carrying out the gain control of this invention.

The flow diagrams of FIGS. 3a-3d represent computer program instructions for the controller 32 for carrying out the control of this invention. FIG. 3a depicts a main or executive program loop comprising an initialization block 220 which is executed at the initiation of cruise operation, and a series of instruction blocks 222-228 which are repeatedly executed during cruise operation. The initialization block 220 initializes or resets the various system flags and variables, such as the LOW GAIN flag and the term OFFSET. The blocks 222-228 successively read the various inputs described in reference to FIG. 1, determine the motor position command, control mode/gain table transitions, and control the motor 10 to the commanded position. The determination of motor position command is further described by the flow diagram of FIG. 3b, and the transition control is further described by the flow diagrams of FIGS. 3c-3d. The motor control routine is set forth in detail in the U.S. Pat. No. 4,684,866 to Nehmer et al., issued Aug. 4, 1987 and assigned to the assignee of the present invention.

Figure 3B:
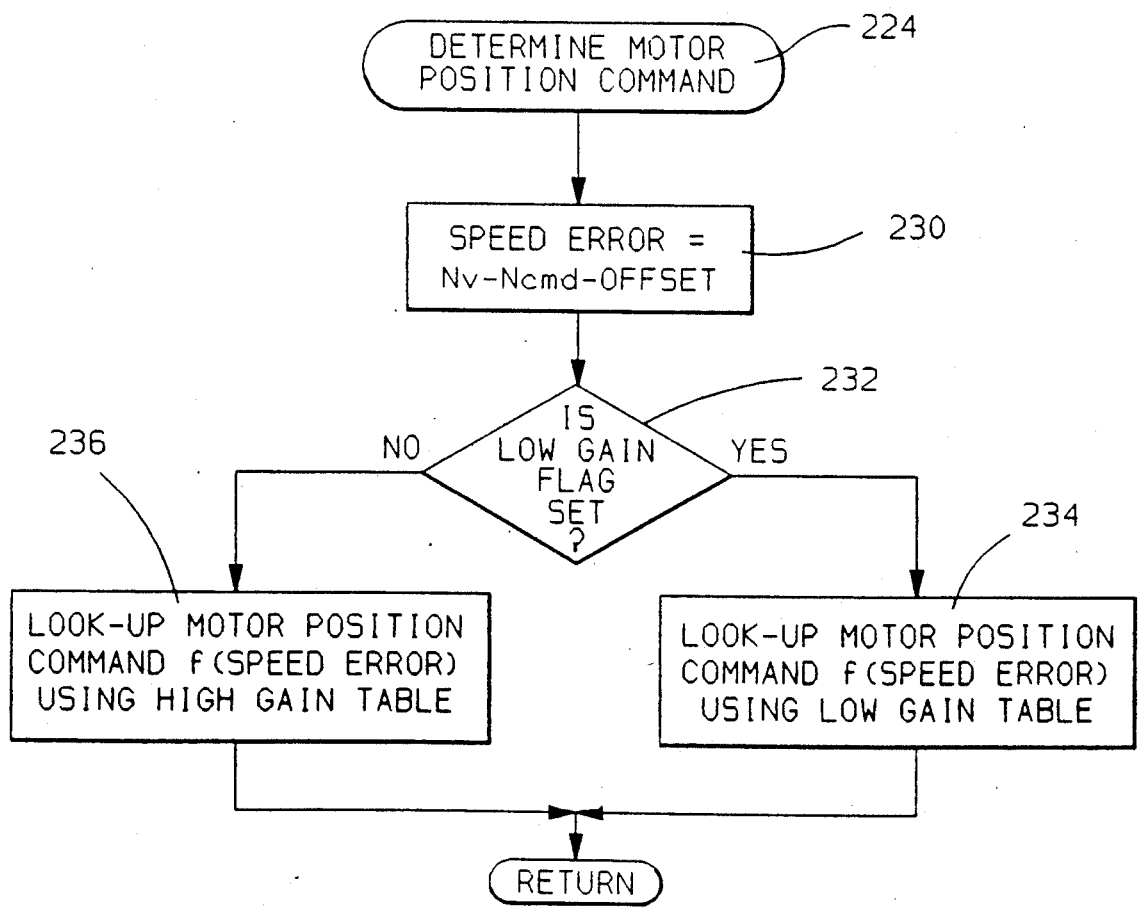

Referring to the DETERMINE MOTOR POSITION COMMAND flow diagram of FIG. 3b, the block 230 is first executed to compute the speed error according to the expression:

$$SPEED\ ERROR = Nv - Ncmd - OFFSET$$

If the LOW GAIN flag is set, as determined by the decision block 232, the block 234 is then executed to look-up the motor position command Ncmd as a function of SPEED ERROR, using a low gain table corresponding to the graph of FIG. 2b. If the LOW GAIN flag is not set, the block 236 is executed to look-up the motor position command Ncmd as a function of SPEED ERROR, using a high gain table corresponding to the graph of FIG. 2a.

Figure 3C:
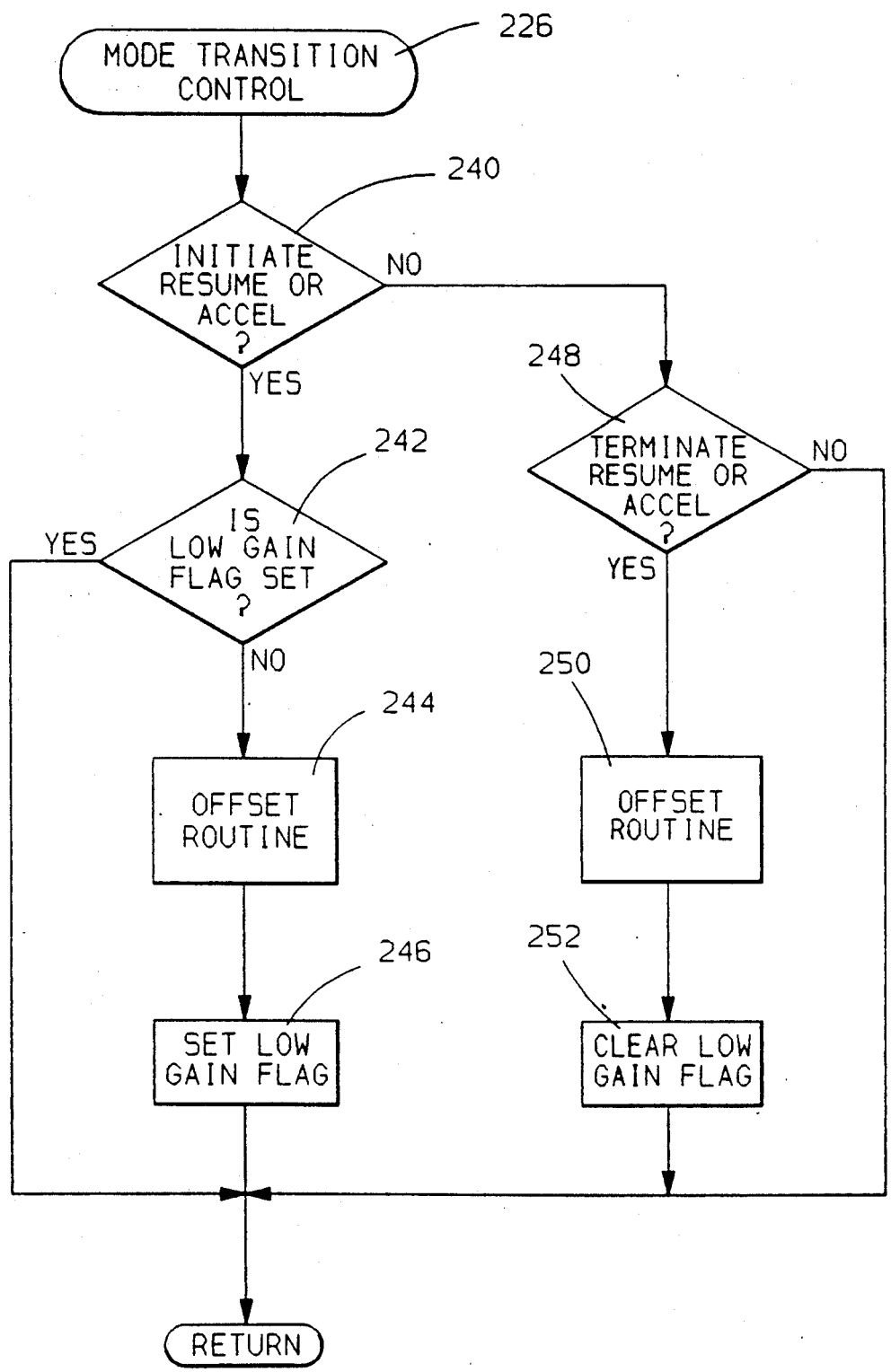

Referring to the MODE TRANSITION CONTROL flow diagram of FIG. 3c, the decision block 240 is first executed to determine if it is time to initiate the resume or acceleration modes of operation. This is determined, as indicated above, by the present state of the cruise control operation, and the operator manipulation of the resume/acceleration switch 90. If it is time to initiate the resume or acceleration modes, and the LOW GAIN flag is not already set (as determined by the block 242), the blocks 244 and 246 are executed to successively update the OFFSET term (FIG. 3d) and set the LOW GAIN flag.

If it is not time to initiate the resume or acceleration modes, the decision block 248 is executed to determine if it is time to terminate the resume or acceleration modes. This occurs, as indicated above, when the vehicle achieves the set speed in the case of the resume mode, or the operator releases the resume/acceleration switch 90 in the case of the acceleration mode. If it is time to terminate the resume or acceleration modes, the blocks 250 and 252 are executed to successively update the OFFSET term (FIG. 3d) and clear the LOW GAIN flag.

Figure 3D:
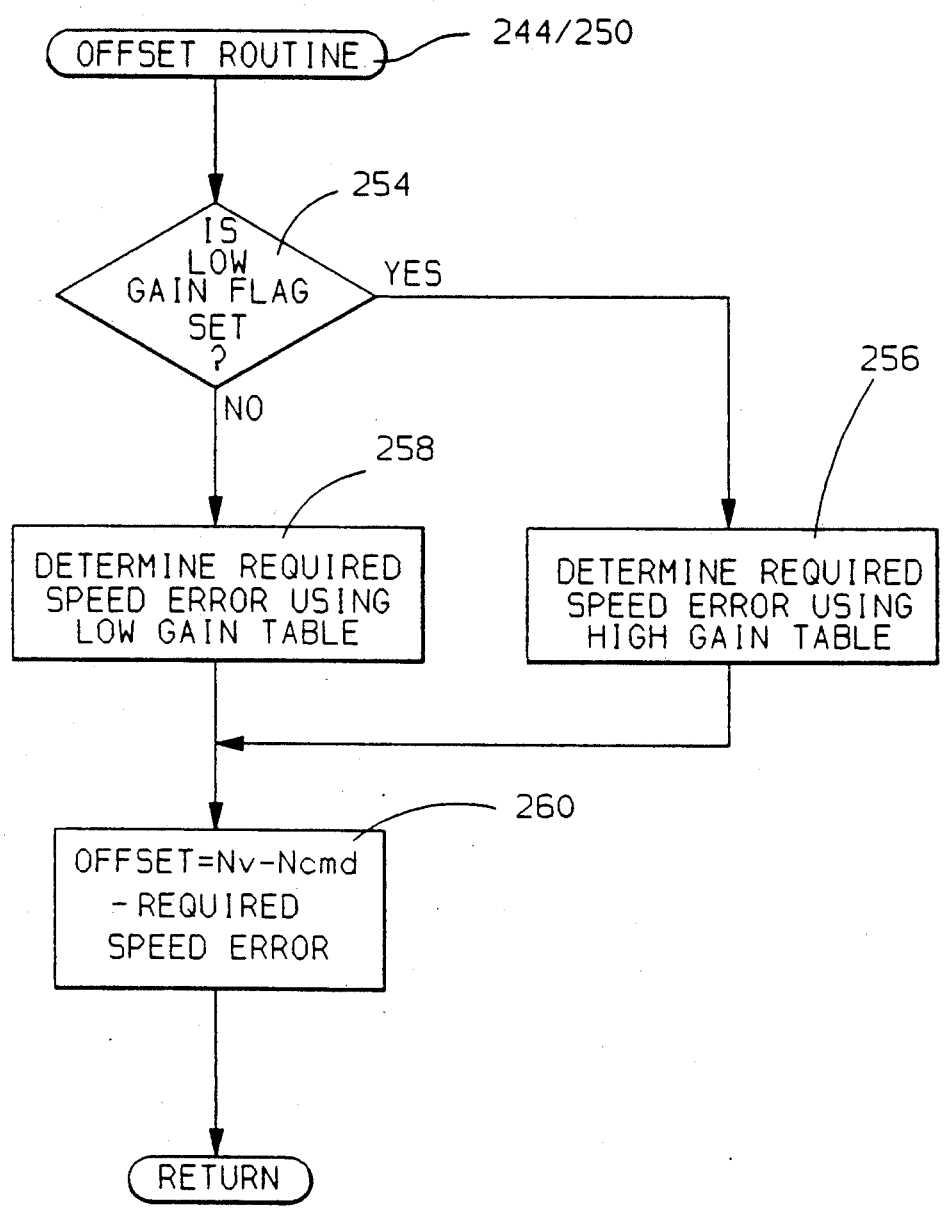

Referring to the OFFSET ROUTINE of FIG. 3d, the decision block 254 is first executed to determine if the LOW GAIN flag is set. If so, a transition from the low gain table to the high gain table is about to take place. In this case, the block 256 is executed to determine the REQUIRED SPEED ERROR for transitioning to the high gain table with no change in the motor position command. This is achieved by an inverse look-up of the speed error from the high gain table as a function of the current motor position command determined at block 234 of FIG. 3b. If the LOW GAIN flag is not set, a transition from the high gain table to the low gain table is about to take place. In this case, the block 258 is executed to determine the REQUIRED SPEED ERROR for transitioning to the low gain table with no change in the motor position command. This is achieved by an inverse look-up of the speed error from the low gain table as a function of the current motor position command determined at block 236 of FIG. 3b. In either case, block 260 is then executed to compute the OFFSET term according to the difference between the actual speed error ($Nv-Ncmd$) and the REQUIRED SPEED ERROR term, or $$OFFSET = Nv - Ncmd - REQUIRED\ SPEED\ ERROR.$$

In this way, the next computation of the SPEED ERROR will be based on the updated OFFSET term, and the motor position command (and hence the engine throttle position) immediately before and after the gain table/mode transition will be substantially the same. From the perspective of the operator, the system response will be well suited to the mode of operation, and transitions between the various modes of operation will be carried out smoothly.

While this invention has been described in reference to the illustrated embodiment, it is expected that various modifications will occur to those skilled in the art. In this regard it should be understood that systems incorporating such modifications may fall within the scope of this invention, which is defined by the appended claims.

The embodiments of the invention in which an exclusive property or privilege is claimed are defined as follows:

1. In a motor vehicle speed control system for positioning an engine throttle in relation to a position command generated to maintain an actual speed at a desired speed, control apparatus comprising:
   means for generating an error signal according to a difference between the actual and desired speeds;
   means effective during a first control mode for generating said position command as a first function of said error signal;
   means effective during a second control mode for generating said position command as a second function of said error signal, a change in said position command during said second control mode for a given change in said error signal being low relative to a corresponding change in said position command during said first control mode; and
   transition control means effective in response to a change between said first and second control modes for offsetting the error signal such that said position command is substantially equal immediately before and after said change in control modes, thereby to effect a smooth transition between said first and second control modes.

2. A motor vehicle speed control system for positioning an engine throttle in relation to a position command generated in relation to a speed error representing a difference between actual and desired vehicle speeds, comprising:
   means effective during a normal mode of operation for retrieving said position command from a high gain look-up table of position command vs. speed error for achieving accurate steady state vehicle speed control;
   means effective during a resume/acceleration mode of operation for retrieving said position command from a low gain look-up table of position command vs. speed error in which a change in said position command for a given change in said speed error is low relative to a corresponding change in said position command during said normal mode of operation, thereby to smoothly accelerate the vehicle to a higher speed; and
   transition control means effective in response to a change in mode of operation for offsetting the speed error such that position commands retrieved from said high gain and low gain look-up tables are substantially equal immediately before and after said change in mode of operation, thereby to effect a smooth transition between said normal and resume/acceleration modes of operation.

3. The system set forth in claim 2, wherein the transition control means is effective:
   in response to a condition signaling a change from said normal mode to said resume/acceleration mode for offsetting said speed error to be used in retrieving said position command from said low gain look-up table; and
   in response to a condition signaling a change from said resume/acceleration mode to said normal mode for offsetting said speed error to be used in retrieving said position command from said high gain look-up table.

4. The system set forth in claim 3, wherein the transition control means includes means for offsetting said speed error by an offset value, the offset value being determined:
   in response to a change from said normal mode to said resume/acceleration mode according to a difference between said speed error and a speed error value retrieved from said low gain look-up table based on a previous value of said position command; and in response to a change from said resume/acceleration mode to said normal mode according to a difference between said speed error and a speed error value retrieved from said high gain look-up table based on said previous value of said position command.

* * * * *